United States Patent [11] 3,625,792

[72] Inventor Paul E. Shaffer
  Pittsburgh, Pa.
[21] Appl. No. 32,419
[22] Filed Apr. 27, 1970
[45] Patented Dec. 7, 1971
[73] Assignee PPG Industries, Inc.
  Pittsburgh, Pa.

[54] FABRICATING GLASS-PLASTIC WINDOWS
  15 Claims, No Drawings

[52] U.S. Cl. ................................................ 156/212,
  156/99, 156/106, 156/245, 156/309
[51] Int. Cl. ...................................................... B32b 17/06
[50] Field of Search ............................................ 156/212,
  214, 309, 99, 104, 106, 245, 307, 308

[56] References Cited
  UNITED STATES PATENTS
  2,965,530 12/1960 Stamm et al. ................. 156/309 X
  3,539,412 11/1970 Miller ............................ 156/106
  FOREIGN PATENTS
  649,106 9/1962 Canada ....................... 156/214

Primary Examiner—Carl D. Quarforth
Assistant Examiner—Harvey E. Behrend
Attorney—Chisholm & Spencer ABSTRACT: A technique for fabricating unbalanced, transparent, glass-plastic windows incorporating a technique to compensate for distortion effects similar to the action of a bimetal during the time-temperature-pressure cycle involved in lamination.

FABRICATING GLASS-PLASTIC WINDOWS

BACKGROUND OF THE INVENTION

This invention relates to the fabrication of so-called unbalanced, transparent, glass-plastic windows. Glass-plastic laminates are well known and have been used as windows for vehicles, buildings and armor-proof installations. Generally, there are two types of glass-plastic laminates, the balanced type in which the laminate has several layers of at least two types of transparent material symmetrically arranged with respect to the central layer of the laminate and the unbalanced type in which the layers comprising the laminate are arranged in nonsymmetrical arrangement so that layers of material having different coefficients of thermal expansion are arranged differently on opposite sides of the planar or curved surface passing through the center of the thickness of the laminate.

An assembly of glass and plastic sheets is usually assembled in the final arrangement desired for the laminated window to be produced. The assembled parts are then subjected to an elevated temperature and pressure for sufficient time to adhere the layers together to form a transparent, laminated assembly that has the appearance of a transparent window of unlaminated construction. The layers when initially assembled do not adhere to one another, but adhere when the assembly is at an elevated temperature during the laminating operation. When the layers cool to room temperature after their lamination, each layer tends to retract thermally at a rate dependent on its coefficient of thermal expansion. In cases where adjacent layers have different coefficients of thermal expansion, stresses are established which tend to distort the shape of the laminated window in a manner similar to the action of a bimetal device. In cases of balanced laminates, these stresses tend to equalize so that distortion is not a factor in the case of laminating balanced window structures. However, distortion is a factor that becomes very serious, particularly in unbalanced assemblies comprising relatively thick, transparent sheets of polycarbonate resin or acrylic plastic with relatively thin sheets of glass, wherein the thermal expansion coefficients of the plastic (polycarbonate and/or acrylic) is many times that of the glass. The distortion resulting from the lamination operation is so great in certain cases that laminates of glass and transparent sheets of plastic having original shapes conforming to the shape and size of a window opening in which installation is desired prior to their lamination are incapable of installation in the window opening after their lamination.

Window panels for aircraft comprise an outer sheet of glass and a plurality of alternating layers of plasticized polyvinyl butyral which serve as interlayers and transparent plastic, such as an acrylic plastic, such as methyl methacrylate, and/or a polycarbonate.

Glass is produced by mixing various batch ingredients in a tank and melting them at a temperature in excess of 2000° F. Sheet glass is drawn upwardly from the tank, whereas plate and float glass is removed between a pair of forming rolls. The rolled glass is ground and polished in the case of plate glass and smoothed without grinding and polishing in the case of float glass by passing the newly formed ribbon in contact over a bath of molten tin and controlling the temperature of the molten tin bath along the path of travel taken by the glass ribbon so that the surfaces of the ribbon are smoothed and the ribbon cooled to a temperature at which its hardened surfaces can withstand contact against hard surfaces of conveyor rolls that convey the glass ribbon through an annealing lehr.

Glass ribbons, whether of sheet glass, plate glass or float glass, are annealed by controlled cooling through the annealing range of the glass and the strain point. After annealing, the glass ribbon can be cut to the desired size.

It is preferred that a glass sheet used as the outer sheet of an aircraft window be tempered and preferably the tempering should be chemical in nature, such as provided by the ion exchange technique of U.S. Pat. No. 3,218,220 to Neill Weber. It is also preferred that the aircraft window include plasticized polyvinyl butyral and relatively rigid, transparent plastic sheets such as polycarbonate resin or stretched acrylic plastic. The reasons for these selections follow.

Unlike annealed glass, which usually breaks into a few large, sharp-edged pieces, thermally tempered glass has greater resistance to breakage on impact, and, when it does break, disintegrates into many small fragments, typically cubes having dimensions equal to the thickness of the glass and relatively blunt edges and corners. Both the size and shape of these fragments make them much less dangerous than fragments of annealed glass. The average particle size of tempered glass is probably related to the specific strain energy of the glass, i.e., the elastic energy stored in a unit volume of the prestressed material. This, in turn, depends primarily on the maximum stresses in the glass, since the parabolic shape of the stress distribution in thermally tempered glass is substantially independent of the level of stress.

Strengthening by chemical means, also called chemical tempering, though somewhat newer than the art of thermal tempering, is also well known. There are several mechanisms by which it may be accomplished. One of these entails ion exchange in the surface layers of the glass at a temperature approaching the strain point of the glass. In the ion exchange, relatively small ions, such as sodium, are replaced by larger ions, such as potassium, or smaller ions, such as lithium, are replaced by larger ions, such as sodium and/or potassium. The crowding of the larger ions into the spaces left by removal of the smaller ions produces a compression of the surface layers. Two other mechanisms for chemical tempering entail either ion exchange or partial crystallization, or both, at elevated temperatures, in such a manner that the modified surface layers of glass have a lower coefficient of expansion than the base glass. When an article thus treated is cooled to room temperature, the differential contraction of the surface and interior layers again produces compressive stresses in the surface.

Since diffusion is a relatively slow process, the effects of chemical tempering do not penetrate very deeply into the glass. This is reflected in the stress distribution in chemically tempered glass. In such glass, the compressive stress ranges from a relatively high level at the surfaces to zero at a depth of only a few thousanths of an inch below the surface. The rest of the interior of the glass sustains only a very low tensile stress, required to balance the compressive forces in the very thin layers near the surfaces. Thus, it may be seen that chemically tempered glass having the same surface compressive stress as thermally tempered glass may have much less interior tension stress and very much lower specific strain energy. Thus, while its strength in the absence of gross surface abrasions may be the same as that of thermally tempered glass, it does not have the same propensity to disintegrate when broken. This may be an advantage in some applications, as will be considered below. It is usually considered a disadvantage in aircraft applications where the small size of fragments is as important as the enhancement of strength. To make for such fine fragmentation, one can raise the surface compressive strength or increase the thickness of the compressed layers, or do both, in order to raise the specific strain energy of the glass to the level at which the particle size of its fragments may be comparable with that of glass thermally tempered to give a surface compression of about 20,000 pounds per square inch. Indeed, the usual chemically tempered glass intended for aircraft applications is made to have surface compressive stresses of the order of 80,000 pounds per square inch.

Comparing thermally and chemically tempered glass, the former has the advantage that the greater thickness of the compressive layers on its surface gives it more abrasion resistance. Chemically tempered glass has the advantage of more readily permitting the attainment of much higher temper stresses, and, therefore, higher strengths. In addition, it has the advantage that the thickness of the compressive layer, and with it the specific strain energy of the material, may be varied at will, permitting the fracture pattern of chemically tempered glass to be controlled independently of its strength.

It is also well known to chemically temper glass that has been previously thermally tempered. This combination of tempering steps places a higher compression stress in the surface of the glass to a lesser depth than the depth of the compression zone produced by thermal tempering, thereby resulting in a stronger glass article than one produced by thermal tempering alone.

According to a typical operation, increased impact resistance, breaking stress and penetration resistance are secured in glass by chemical tempering. In a typical example with an alkali silica glass, for example, soda-lime-silica glass, a glass sheet is contacted with a potassium salt at a selected temperature range, preferably above 875° F. and below the strain point of the glass, for sufficient time for an exchange to take place in the surface zone of the glass. Preferably, the glass sheet is immersed in a molten bath of a potassium salt, preferably potassium nitrate. During immersion, an exchange takes place wherein potassium from the potassium bath is introduced into the glass surface, apparently in exchange for sodium present in the exterior or surface zone of the glass sheet. It is believed that chemical tempering of soda-lime-silica glass is an ion exchange phenomenon wherein potassium ions are exchanged for sodium ions.

Other glass compositions may be chemically tempered by immersion in alkali metal salt baths. For example, an alkali silica glass containing lithium may be advantageously chemically tempered by immersion in a molten bath of a sodium salt or a potassium salt or a mixture thereof at an elevated temperature approaching the strain point of the glass. It is also possible to provide a multiple-step chemical tempering operation in which a lithium-containing glass has its lithium ions exchanged for sodium ions, which, subsequently, are exchanged for potassium ions in a second immersion wherein the sodium-enriched surface zone produced by the first ion exchange operation becomes a potassium-enriched surface zone during the second immersion.

After treating the glass composition as recited in the chemical tempering operations described above, the chemical nature of the alkali metal oxide constituents of the surface zone of the glass article is altered radically with replacement of lithium by sodium and/or potassium or sodium by potassium, depending upon the initial glass composition. At the same time the central interior regions of the glass article contain substantially the same concentration of alkali metal as before the treatment.

At lower temperatures the effect of such contact with a molten metal salt is much slower with the result that chemically tempered glass articles are difficult to achieve within the periods of time which are commercially practicable. For example, an immersion of soda-lime-silica glass for 1 hour in molten potassium nitrate at 700° F. does not improve the strength properties of the glass substantially. Much longer periods of immersion at this temperature are required to produce strength compressibility to that achieved in the minimal time periods (5 to 10 minutes) at higher temperatures. At temperatures exceeding 870° F., the desired strength improvement occurs even more rapidly.

The upper limit of the contact temperature depends upon the softening temperature and melting temperature of the glass article under treatment. The contact temperature cannot exceed the melting temperature of the glass composition but it can exceed the strain point and even the softening point of the glass composition under certain circumstances. For example, as long as the glass can be supported properly, the contact temperature can be maintained even at a temperature above the softening temperature of the glass provided the contact at these elevated temperatures is of sufficiently short duration to avoid thermal relaxation of the ion-exchange-induced strength characteristics. In fact, in some cases it is possible to maintain the contact temperature within the softening temperature range of the particular glass article undergoing treatment. Under these thermal conditions, extremely short contact times can be employed such as on the order of 1 minute or less.

Polyvinyl butyral is formed by reacting butyraldehyde with polyvinyl alcohol. The alcohol groups left unreacted are calculated as the percent vinyl alcohol remaining in the polymer. Present-day safety-glass laminates are made using an interlayer whose base resin is composed of a polyvinyl alcohol partially condensed with butyraldehyde so that it contains from 15 percent to 30 percent of unreacted hydroxyl groups calculated as weight percent of vinyl alcohol, less than 3 percent by weight of ester groups calculated as weight percent of vinyl acetate and the remainder of acetal groups calculated as vinyl butyral. This material is commonly called "polyvinyl butyral" or more exactly "partial polyvinyl butyral." Conventionally, polyvinyl butyral, as used in safety-glass laminates, contains a plasticizer.

Generally, the plasticizers used are water-insoluble esters of a polybasic acid or a polyhydric alcohol. Particularly desirable plasticizers for use in the present invention are triethylene glycol di(2-ethyl-butyrate), dibutyl sebacate, di(beta-butoxy-ethyl) adipate, and dioctyl phthalate. Other suitable plasticizers include triethylene glycol fully esterified with a mixture of 80–90 percent caprylic acid and 10–20 percent capric acid as described in U.S. Pat. No. 2,372,522, dimethyl phthalate, dibutyl phthalate, di(butoxyethyl) sebacate, methyl palmitate, methoxyethyl palmitate, triethylene glycol dibutyrate, triethylene glycol diacetate, tricresyl phosphate, triethyl citrate, butyl butyryl lactate, ethyl para-toluene sulfonamide, dibutyl sulfone, lauryl alcohol, oleyl alcohol, glycerol triricinoleate, methyl lauroyl glycolate, butyl octanoyl glycolate and butyl laurate. The above list of plasticizers does not represent all the known plasticizers which can be used. Such a list would be impractical and would serve no purpose since one skilled in the art can readily select a plasticizer from the many already known. It has been found preferably to use about 37.5 parts by weight of dibutyl sebacate plasticizer for every 100 parts by weight of polyvinyl butyral for aircraft panels with rigid plastic sheets.

The polycarbonate may be any suitable sheet of polycarbonate, such as that disclosed in U.S. Pat. Nos. 3,038,365 and 3,117,019, and is preferably prepared by reacting di(monohydroxyaryl) alkanes with derivatives of the carbonic acid such as phosgene and bischloro-carbonic acid esters of di(monohydroxyaryl) alkanes.

The aryl residues of the di(monohydroxyaryl) alkanes can be alike or different. The aryl residues can also carry substituents which are not capable of reacting in the conversion into polycarbonates, such as halogen atoms or alkyl groups, for example, the methyl, ethyl, propyl, or tert-butyl group. The alkyl residue of the di(monohydryxyaryl) alkanes linking the two benzene rings can be an open chain or a cycloaliphatic ring and may be substituted, if desired, for example by an aryl residue.

Suitable di(monohydroxyaryl) alkanes are, for example, (4,4'-dihydroxy-diphenyl) methane, 2,2-(4,4'-dihydroxy-diphenyl) propane, 1,1-(4,4'-dihydroxy-diphenyl) cyclohexane, 1,1-(4,4'-dihydroxy-3,3'-dimethyl-diphenyl) cyclohexane, 1,1-(2,2'-dihydroxy-4,4'-dimethyl-diphenyl) butane, (boiling point: 185–188° C. under 0.5 mm. mercury gauge), 2,2(2,2'4,4'-di-tert-butyl-diphenyl) propane or 1,1'-(4,4'-dihydroxy-diphenyl)-1-phenyl ethane; furthermore, methane derivatives which carry besides two hydroxyaryl groups an alkyl residue with at least two carbon atoms and a second alkyl residue with one or more carbon atoms such as 2,2-(4,4'-dihydroxy-diphenyl) butane, 2,2-(4,4'-dihydroxy-diphenyl) pentane (melting point 149–150° C.), 3,3-(4,4'-dihydroxy-diphenyl) pentane, 2,2-(4,4'-dihydroxy-diphenyl) hexane, 3,3-(4,4'-dihydroxy-diphenyl) hexane, 2,2-(4,4'-dihydroxy-diphenyl)-4-methyl pentane (melting point 151–152°C.), 2,2-(4,4'-dihydroxy-diphenyl) heptane (boiling point 198–200° C. under 0.33 mm. mercury gauge), 4,4-(4,4'-dihydroxy-diphenyl) heptane (melting point 148–149° C.), or 2,2-(4,4'-dihydroxy-diphenyl) tridecane. Suitable di(monohydroxyaryl) alkanes the two aryl residues of which are different are, for example, 2,2-(4,4'-dihydroxy-3'-methyldiphenyl) propane and 2,2-(4,4'-dihydroxy-3-methyl-3'-isopropyl-diphenyl) butane, Suitable di(monohydroxyaryl) alkanes the aryl residues of which carry halogen atoms are, for instance 2,2-(3,5,3', 5'-tetrachloro-4,4'-dihydroxy-diphenyl) propane, 2,2-(3,5,3', 5'-tetrabromo-4,4'-dihydroxy-diphenyl) propane, (3,3'-dichloro-4,4'-dihydroxy-diphenyl) methane and 2,2'-dihydroxy-5,5'-difluoro-diphenyl methane. Suitable di(monohydroxyaryl) alkanes the alkyl residue of which linking the two benzene rings is substituted by an aryl residue are, for instance, (4,4'-dihydroxy-diphenyl) phenyl methane and 1,1-(4,4'-dihydroxy-diphenyl)-1-phenyl ethane.

In order to obtain special properties, mixtures of various di(monohydroxyaryl) alkanes can also be used, thus mixed polycarbonates are obtained.

The conversion of the aforesaid di(monohydroxyaryl) alkanes into high-molecular polycarbonates by reacting with the mentioned derivates of the carbonic acid may be carried out as known in the art. For instance, the di(monohydroxyaryl) alkanes can be reesterified with carbonic acid diesters, e.g., dimethyl-, diethyl-, dipropyl-, dibutyl-, diamyl-, dioctyl-, dicyclohexyl-, diphenyl- and di-o, p-tolyl carbonate at elevated temperatures from about 50 to about 320° C. and especially from about 120 to about 280° C.

The polycarbonates can also be produced by introducing phosgene into solutions of di(monohydroxyaryl) alkanes in organic bases, such as dimethylaniline, diethylaniline, trimethylamine and pyridine, or into solutions of di(monohydroxyaryl) alkanes in inert organic solvents, such as benzine, ligroine, cyclohexane, methylcyclohexane, benzene, toluene, xylene, chloroform, methylene chloride, carbon tetrachloride, trichloroethylene, dichloroethane, methylacetate, and ethylacetate, with the addition of an acid-binding agent as mentioned above.

A process particularly suitable for producing polycarbonates consists in introducing phosgene into the aqueous solution or suspension of alkali metal salts such as lithium-, sodium-, potassium- and calcium salts of the di(monohydroxyaryl) alkanes, preferably in the presence of an excess of a base such as lithium-, sodium-, potassium- and calcium hydroxide- or carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

The phosgene may be used in an equivalent amount. Generally, however, it is preferable to use an excess of phosgene.

Finally, it is also possible to react the di(monohydroxyaryl) alkanes with about equimolecular amounts of bischloro carbonic acid esters of di(monohydroxyaryl) alkanes under corresponding conditions.

In the production of polycarbonates according to the various processes, it is advantageous to employ small amounts of reducing agents, for example, sodium-, or potassium-sulphide, -sulphite and dithionite or free phenol and p-tert-butylphenol.

By adding monofunctional compounds which are capable of reacting with phosgene or with the end groups of the polycarbonates consisting of the chlorocarbonic acid ester group and which terminate the chains, such as the phenols, for instance, the phenol, the tert-butyl-phenol, the cyclohexylphenol, and 2,2-(4-hydroxyphenol-4'-methoxy-phenyl) propane, further aniline and methylaniline, it is possible to regulate the molecular weight of the polycarbonates in wide limits.

The reaction of the di(monohydroxyaryl) alkanes with phosgene or of the chlorocarbonic esters of the di(monohydroxyaryl) alkanes may be carried out at room temperature or at lower or elevated temperatures, that is to say at temperatures from the freezing point to the boiling point of the mixture. (column 1, line 31, to column 3, line 1, of 3,038,365.) The polycarbonate film preferably has a thickness of from about 5 to about 250 mils and most preferably from about 60 to about 100 mils. In some cases, it may be desirable to use copolymers of various dihydroxy aryl propanes in order to achieve special properties.

Other pellucid materials are disclosed in U.S. Pat. No. 3,069,301 at column 1, lines 62-68, which are rigid and resistant to scratching and essentially nonhydroscopic.

Acrylic resins, and particularly the polymethacrylates, have found a major use in the manufacture of aircraft canopies or glazings due in part to their outstanding optical properties, e.g., clarity and transparency. Two polymethacrylate resins particularly well adapted for this purpose are marketed by Rohm & Haas under the trade designations "Plexiglas II" and "Plexiglas 55," both of which resins are essentially comprised of polymethylmethacrylate. The two materials are commercially available in cast sheet form and differ principally in heat resistance, the "Plexiglas 55" being the more heat resistant of the two materials.

While the cast acrylic sheeting may be employed in the production of aircraft glazings, it has been found that the impact strength, resistance to crack propagation, and the craze resistance thereof can be substantially improved by stretching of the as-cast sheeting. While not attempting to set forth any precise or uncontradictory theory in explanation of these strength improvements, it is believed that such stretching affects the molecular structure of the polymer. It appears to disentangle and uncoil the linear molecules and partially orient them parallel to the direction of stretch. This in turn results in the upgrading of the impact strength, resistance to crack propagation and craze-resistance properties without adversely affecting the excellent optical properties of the material.

The optimum improvement in the physical properties of an acrylic sheet is obtained when such sheet material is stretched about 75 to 100 percent either biaxially or multiaxially. Such stretching particularly produces a many-fold increase in resistance to crack propagation. This property, which is a measure of the "toughness" or "shatter resistance" of the material, is of obvious importance in the glazing of aircraft which are pressurized during flight.

A commonly accepted method for quantitatively expressing the crack propogation resistance of stretched acrylic materials is the $dW/dA$ value which is a measure of the work absorbed per unit area of crack extension during rapid crack growth. As-cast acrylic sheet materials show a $dW/dA$ value of approximately 4. When stretched 75 to 100 percent, this value is increased to from 20 to 30. At this level of resistance to crack propogation, the stretched acrylics show excellent resistance to "blowout" failure when damaged during pressurized flight. As a result of the improved properties possessed by the stretched acrylics, they have, to a considerable extent, replaced the as-cast sheeting for aircraft glazing use.

It will be appreciated that for certain purposes it is desirable to laminate the stretched acrylic sheeting either to another sheet of stretched acrylic, to an as-cast sheet of acrylic, to another plastic material or to glass in producing aircraft glazings. For example, it is desirable to laminate the stretched acrylic sheet if heating means for deicing or defogging, such as electrically conducting films or wire grids, are to be included as part of the aircraft windshield or window. Where a transparent electrically conductive film is used, lamination serves to protect the rather fragile film against damage by scratching, or attack by moisture or corrosive gases in the atmosphere. Also, lamination will provide an insulating cover for the film thereby preventing accidental grounding. Where a conducting wire grid is used for deicing or defogging, it can conveniently be imbedded in an interlayer material which is interposed between a sheet of stretched acrylic and a second sheet which may be either stretched acrylic or some other synthetic plastic material or glass.

A typical method and apparatus for stretching acrylic plastic is disclosed and claimed in U.S. Re. Pat. No. 24,978 of Paul H. Bottoms et al.

THE PRESENT INVENTION

The present invention suggests a method of fabricating an unbalanced, transparent laminated window, comprising a transparent sheet of plastic, a transparent sheet of glass having a different coefficient of thermal expansion from that of said plastic, and an interlayer of bonding material, to a desired ultimate shape, comprising the steps of:

1. bending said glass sheet to a predetermined shape different from said desired ultimate shape,
2. bending said transparent sheet of plastic to a shape conforming to said predetermined shape and compensating for the combined thickness of said interlayer and said glass sheet,
3. assembling said bent glass sheet and said bent transparent sheet of plastic to opposite sides of said interlayer of thermoplastic material to form a window assembly,
4. subjecting said window assembly to an elevated temperature and an elevated pressure for sufficient time to produce a transparent, laminated window, and
5. cooling said laminated window to normal room conditions to distort said laminated window into said desired shape.

More particularly, the predetermined shape for the glass sheet is determined by laminating an assembly of a glass sheet and a transparent sheet of plastic, both individually bent to the ultimate shape desired, and assembled in opposite order from the arrangement of the ultimate assembly to form a reverse order assembly, and laminated while so assembled in said reverse order with an interlayer under approximately identical conditions of elevated temperature, elevated pressure and time as those to which said window assembly of said glass sheet bent to said predetermined shape, said sheet of plastic bent to said conforming shape and said interlayer is subjected.

The conforming shape of the sheet of transparent plastic material is readily determined mathematically by taking into account the total thickness of the glass sheet and adjacent interlayer. Thus, the exposed surface of the glass sheet bent to the predetermined shape in the laminate produced from the reverse order assembly in used as a model for a shaping surface of a mold for bending glass sheets. A second shaping surface for a conforming shape of a transparent plastic sheet is then developed to determine the shape of the surface of the first transparent plastic sheet adjacent the glass sheet bent to said predetermined shape taking into account the total thickness of the glass sheet and the interlayer.

In fabricating assemblies having more than one sheet of transparent plastic, the shaping surface of each successive mold is calculated from the shaping surface of the mold whose surface determines the immediately preceding conforming sheet of transparent plastic. The calculation for each mold-shaping surface takes into account the total thickness of the transparent sheet of plastic and of the intervening interlayer in each case.

The following examples of detailed embodiments of the present invention to laminate flat and curved unbalanced glass-plastic windows will facilitate an understanding of the present invention.

EXAMPLE I

A flat sheet of polymethyl methacrylate sold under the trade name of PLEXIGLAS, 26 inches by 4 inches by ¼ inch, is assembled on one side of a sheet of interlayer material 0.075 inch thick composed of polyvinyl butyral resin plasticized with 37.5±2.0 parts by weight of dibutyl sebacate per 100 parts of resin and a flat sheet of chemically tempered glass 0.110 inch thick assembled the other side of the sheet of interlayer material. The glass sheet has a chemical composition consisting essentially of the following parts by weight: $SiO_2$—62.0; $Al_2O_3$20.1; $Li_2O$—4,8; $Na_2O$—7.9; $B_2O_3$—4.6; Cl—0.5; and $As_2O_5$='0.1. The assembly is inserted within a polyethylene-mylar bag about 0.005 inch thick and subjected to a temperature of 215° F. and a pressure of 200 pounds per square inch for a period of 60 minutes. After reducing the temperature to 100° F. and maintaining the elevated pressure for an additional 20 minutes, the pressure is reduced to atmospheric conditions, the assembly is removed from the bag and inspected. The assembly, when inspected, possesses a warped shape incorporation a maximum depth of bend of about ½ inch with the plastic sheet of the warped assemble having a concavely shaped outer surface and the glass sheet a convexly shaped outer surface.

EXAMPLE II

Individual glass and plastic sheets having the same outline dimensions as in example I are bent to the outer shapes of the warped assembly produced as in example I. An assembly is formed with a plastic interlayer having the same dimensions as the interlayer in example I, with the bent plastic sheet having its convex surface exposed and the interlayer against its concave surface and the bent glass sheet assembled with its concave surface against the exposed surface of the interlayer and its concave surface exposed. The bent assembly is inserted in a bag as in example 1 and subjected to a pressure-temperature-time cycle identical to that described for example I. The laminated assembly removed from the bag is flat.

The experiments described in examples I and II demonstrate the feasibility of the present invention. Similar experiments performed with assemblies similar to those of examples I and II except for substituting polycarbonate plastic provide the same conclusions.

The utility of the present invention is further illustrated by the successful completion of a test involving bending and laminating a commercial aircraft windshield comprising, in sequence, an outer sheet of chemically tempered glass 0.110 inch thick, a first interlayer of polyvinyl butyral plasticized with 37.5 parts by weight of dibutyl sebacate 0.075 inch thick, a first sheet of stretched polymethyl methacrylate 0.9 inch thick, a second interlayer 0.05 inch thick having the same composition as the first interlayer and a second sheet of polymethyl methacrylate 0.7 inch thick. The details of this successful test are described in example III.

EXAMPLE III

A plastic mold having an upper surface conforming to the shape desired for the outer surface of the glass sheet and marking its outline and those of the plastic sheets served as a model for making molds to shape the glass sheet and the first and second methyl methacrylate sheets forming the window. The glass sheet and each of the plastic sheets were bent to the shape of their respective molds, which conformed in shape to the mold for the glass sheet, except that the mold for the first methyl methacrylate sheet has its shaping surface compensated for a thickness of 0.185 inch (the total thickness of the glass sheet and the first interlayer) and the mold for the second methyl methacrylate sheet had its shaping surface compensated for a thickness of 1.585 inches with respect to the glass sheet mold (the total thickness of the glass sheet, the first methyl methacrylate sheet and the two interlayers), which corresponds to a compensation of 1.4 inches with respect to the mold for the first methyl methacrylate sheet (the total thickness of the first methyl methacrylate sheet and the second interlayer).

The three bent sheets were assembled in the order exactly opposite that listed above including alternating interlayers of the aforesaid plasticized polyvinyl butyral of the requisite thicknesses to form a reverse order assembly that was inserted within a polyethylene-mylar bag. The bag was evacuated and sealed and the sealed bag and its contents subjected to a standard laminating cycle that comprises exposure for 60 minutes to a pressure of 200 pressure per square inch at a temperature of 215° F., then cooling to 100° F. in 20 minutes and holding the assembly in the 100° F. atmosphere while continuing to maintain the 200 pounds per square inch pressure. The pressure was then removed and the laminated assembly removed from the bag. It failed to match the curvature of the glass-bending mold which served as a checking fixture. This failure was expected in the light of the teachings in example I and II.

° F. atmosphere while continuing to

The nonconforming laminate so produced from the reverse order assembly became the model for molds to produce the final assembly that it was hoped would match the checking fixture. The mold for the distorted bent glass was designed from the exposed surface of the methyl methacrylate sheet of the nonconforming laminate produced by laminating the reverse order assembly and the molds for the methyl methacrylate sheets were modeled from the mold designated to conform to the distorted bent glass sheet. However, the mold for producing the first distorted sheet of plastic compensated for the total thickness of the glass sheet and the first interlayer, and the mold to shape the second distorted sheet of methyl methacrylate was also similar to the shape of the mold for the distorted glass sheet except that it compensated for the total thickness of the two plastic interlayers plus that of the glass sheet plus that of the first sheet of methyl methacrylate.

The sheets of glass and methyl methacrylate were bent to conform to the distorted shapes of the last three respective molds and assembled in the original order listed, that is, in exactly opposite order to their order in the reverse order assembly that resulting in the nonconforming laminate. The correct order assembly of the distorted glass and methyl methacrylate sheets and plasticized polyvinyl butyral interlayer was then inserted in a mylar-polyethylene bag. The bag was evacuated and sealed and subjected to the following time-temperature-pressure cycle: 60 minutes at 215° F. and 200 pounds per square inch, then cool to 100° F. in 20 minutes and hold at 100° F. for an additional 20 minutes while maintaining the pressure at 200 pounds per square inch. The pressure was then released and the laminate removed from the bag and the exposed glass sheet held against the checking fixture. This time, the glass sheet conformed in both shape and outline within the tolerances required by the customer.

The present invention has taught the glass-plastic laminating art a technique for laminating unbalanced laminated windows and, particularly, for determining how much distortion to impart to the unplasticized layers comprising the unbalanced laminated window. This technique involved forming a reverse order assembly of parts shaped to the shape desired in the ultimate laminated window, laminating these parts under conditions identical to the time, temperature and pressure conditions prevailing during final lamination to form a nonconforming laminate, forming molds conforming to the shapes of certain parts of the nonconforming laminate, shaping said certain parts to said conforming molds, assembling said certain parts in the proper order separated by thermoplastic interlayers, and laminating said parts conforming to said conforming molds and said interlayers to produce a laminated window conforming within desired tolerance to the ultimate shape desired.

While the description above of illustrative embodiments of the present invention relates to unbalanced assemblies having interlayers of plasticized polyvinyl butyral, it is equally applicable to assemblies having other well-known interlayer materials, such as polyurethanes, silicones and the like. Similarly, the glass sheet in the laminate may be of thermally tempered glass or even untempered or partly tempered glass, coated or uncoated, without affecting the manner of practicing the invention recited in the claimed subject matter that follows.

What is claimed is:

1. A method of fabricating an unbalanced, transparent laminated window, comprising a transparent sheet of plastic, a transparent sheet of glass having a different coefficient of thermal expansion from that of said plastic, and an interlayer of bonding material, to a desired ultimate shape, comprising the steps of;
    a. bending said glass sheet to a predetermined shape different from said desired ultimate shape,
    b. bending said transparent sheet of plastic to a shape conforming to said predetermined shape and compensating for the combined thickness of said interlayer and said glass sheet,
    c. assembling said bent glass sheet and said bent transparent sheet of plastic to opposite sides of said interlayer of thermoplastic material to form a window assembly,
    d. subjecting said window assembly to an elevated temperature and an elevated pressure for sufficient time to produce a transparent, laminated window, and
    e. cooling said laminated window to normal room conditions to distort said laminated window into said desired shape.

2. A method as in claim 1, wherein said predetermined shape of said glass sheet is obtained by duplicating the shape of said glass sheet produced by laminating an assembly of a glass sheet and a transparent sheet of plastic, both individually bent to the ultimate shape desired, and assembled in opposite order from the arrangement of the ultimate assembly to form a reverse order assembly, and laminated while so assembled in said reverse order with an interlayer under approximately identical conditions of elevated temperature, elevated pressure and time as those to which said window assembly of said glass sheet bent to said predetermined shape, said sheet of plastic bent to said conforming shape and said interlayer is subjected.

3. A method as in claim 1, wherein said transparent window comprises a plurality of sheets of transparent plastic with adjacent sheets of said transparent plastic separated by an additional interlayer and each additional transparent sheet of plastic is bent to a predetermined shape conforming to the conforming shape of its adjacent sheet of transparent plastic and compensating for the combined thickness of said additional plastic interlayer and said adjacent sheet of transparent plastic.

4. A method as in claim 3, wherein said predetermined shape of said glass sheet and said predetermined conforming shapes of each said sheets of transparent plastic are obtained by duplicating the shapes of the individual sheets produced by laminating an assembly of a glass sheet and a plurality of transparent sheets of plastic, all individually bent to the ultimate shape desired and assembled in opposite order from the arrangement of the ultimate window assembly with a layer of interlayer material between adjacent sheets to form a reverse order assembly, and laminated while so assembled in said reverse order under approximately identical conditions of elevated temperature, elevated pressure and time as those to which said window assembly comprising said glass sheet bent to said predetermined shape, said sheets of plastic bent to said predetermined conforming shapes and said interlayers are subjected during said final lamination.

5. A method of producing an unbalanced, curved, glass-plastic laminated window comprising a plurality of sheets of transparent material arranged in asymmetrical relation with respect to the center of the thickness of the window comprising:
    a. individually shaping each of a plurality of sheets to conform with the shape required in said window,
    b. assembling said sheets with plastic interlayers separating adjacent of said sheets of transparent material in the reverse order of that required in said window to form a reverse order assembly,
    c. laminating said reverse order assembly according to a time-temperature-pressure cycle approximating a predetermined laminating cycle, thereby forming a laminate that does not conform to the shape desired for said window,
    d. forming a mold conforming to the shape of each of said sheets of said nonconforming laminate,
    e. shaping a sheet to each of the molds formed according to step (d),
    f. assembling said sheets shaped as in step (e) with plastic interlayers separating adjacent of said shaped sheets in the order required for said window to form a proper order assembly.
    g. laminating said proper order assembly according to said time-temperature-pressure cycle of said predetermined laminating cycle, and h. cooling said laminated assembly so formed.

6. A method of claim 5, wherein said plastic interlayers are sheets of plasticized polyvinyl butyral.

7. A method as in claim 5, said plastic interlayers are composed of polyurethane.

8. A method as in claim 5, wherein said plastic interlayers are composed of silicone.

9. A method as in claim 5, wherein said laminated window is curved to have an exposed convex surface and an exposed concave surface, and said sheet forming said exposed convex surface is glass.

10. A method as in claim 9, wherein said glass sheet is chemically tempered by ion exchange prior to its assembly.

11. A method as in claim 9, wherein said sheet forming said exposed concave surface of said laminated window is an acrylic plastic.

12. A method as in claim 11, wherein said glass sheet and said acrylic plastic sheet so treated are of different thickness.

13. A method as in claim 9, wherein said sheet forming said exposed concave surface of said laminated window is a polycarbonate resin.

14. A method as in claim 13, wherein said glass sheet and said polycarbonate sheet are of different thickness.

15. A method as in claim 9, wherein said glass sheet is thermally tempered prior to its assembly.

* * * * *